United States Patent
Glitho et al.

(10) Patent No.: US 6,687,356 B1
(45) Date of Patent: Feb. 3, 2004

(54) SYSTEM AND METHOD FOR PROVIDING DEVICE-AWARE SERVICES IN AN INTEGRATED TELECOMMUNICATIONS NETWORK

(75) Inventors: Roch Glitho, Montreal (CA); Christophe Gourraud, Montreal (CA)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/536,962

(22) Filed: Mar. 28, 2000

Related U.S. Application Data

(60) Provisional application No. 60/140,013, filed on Jun. 18, 1999.

(51) Int. Cl.[7] .............................................. H04M 3/42
(52) U.S. Cl. ............................ 379/201.12; 379/88.17; 370/215; 370/217
(58) Field of Search ........................ 379/211.02, 211.05, 379/212.01, 215.01, 88.17; 370/217, 215, 201.12

(56) References Cited

U.S. PATENT DOCUMENTS

| | | | |
|---|---|---|---|
| 5,812,865 A | | 9/1998 | Theimer et al. ............. 395/800 |
| 5,920,820 A | * | 7/1999 | Qureshi et al. ............. 455/461 |
| 5,946,386 A | * | 8/1999 | Rogers et al. ............... 379/265 |
| 6,003,031 A | * | 12/1999 | Hartikainen et al. ........ 379/201 |
| 6,014,377 A | * | 1/2000 | Gillespie ..................... 379/210 |
| 6,373,817 B1 | * | 4/2002 | Kung et al. .................... 379/88 |
| 6,418,215 B1 | * | 7/2002 | Schessel ................. 379/207.02 |

FOREIGN PATENT DOCUMENTS

| | | |
|---|---|---|
| WO | WO 96/38018 | 11/1996 |
| WO | WO 98/48542 | 10/1998 |

\* cited by examiner

Primary Examiner—Creighton Smith
(74) Attorney, Agent, or Firm—Smith & Danamraj, PC

(57) ABSTRACT

A system and method of device-aware service provisioning in a hybrid/integrated telecommunications network having a packet-switched network portion (PSN) and heterogeneous circuit-switched network (CSN) portions. A user profile is provided which partitions a service in three dimensions: a user-specific service part, a device-specific service part, and a combination part which specifies service conditions when an end-user uses a particular device or terminal. A common IP telephony Value-Added Services infrastructure is included wherein device-aware service triggers are provided for triggering appropriate service partitions of the user profile. Upon encountering a device-aware service trigger in a call control process, a service switching node queries the user profile and determines the service conditions associated with the particular device-specific service part to be invoked. Responsive to determining the service conditions, the service switching node instructs a service node to execute an appropriate Service Logic Program. Upon receiving a result or an indication thereof from the service node, the service switching node takes a corresponding service action.

19 Claims, 6 Drawing Sheets

SYSTEM AND METHOD FOR PROVIDING DEVICE-AWARE SERVICES IN AN INTEGRATED TELECOMMUNICATIONS NETWORK

PRIORITY STATEMENT UNDER 35 U.S.C §119 (e) & 37 C.F.R. §1.78

This nonprovisional application claims priority based upon the following prior U.S. provisional patent application entitled: "System and Method for Providing Value-Added Services in IP Telephony," Ser. No. 60/140,013, filed Jun. 18, 1999, in the names of: Roch Glitho, Christophe Gourraud, and Evelina Evloguieva.

BACKGROUND OF THE INVENTION

1. Technical Field of the Invention

The present invention relates to telecommunication systems and, more particularly, to a system and method for providing device-aware services in a telecommunications network such as, for example, a hybrid network having a packet-switched network (PSN) portion that is operable with the Internet Protocol (IP).

2. Description of Related Art

Several advances are currently taking place in the field of telecommunications networks. One of the most significant developments is using packet-switched network (PSN) infrastructures (e.g., those based on IP addressing) as a replacement for, or as an adjunct to, the existing circuit-switched network (CSN) infrastructures used in today's telephony. The benefits of using or adding PSNs for telephony are well known: from the network operators' perspective, the inherent traffic aggregation in packet-switched infrastructures allows for a reduction in the cost of transmission and the infrastructure cost per end-user. Ultimately, such cost reductions enable the network operators to pass on the concomitant cost savings to the end-users.

Some of the market drivers that impel the existing Voice-over-IP (VoIP) technology are: improvements in the quality of IP telephony; the Internet phenomenon; emergence of standards; cost-effective price-points for advanced services via media-rich call management, et cetera. Some of the well known emerging standards in this area are, for example, the H.323 protocol developed by the International Telecommunications Union (ITU), Session Initiation Protocol (SIP), developed by the Internet Engineering Task Force (IETF), etc. Using these protocols, devices such as personal computers can inter-operate seamlessly in a vast inter-network, sharing a mixture of audio, video, and data across all forms of PSNs which may interface with CSN portions.

As is well known in the telecommunications industry, services and service provisioning are among the principal purposes of a telecommunications network, including VoIP networks. Services are typically categorized into (i) "basic services" (i.e., services which allow basic call processes such as call establishment and termination) or (ii) "advanced services" which are also commonly referred to as Valued-Added Services (VAS). Examples of advanced services include split charging, 800-services, credit card calls, call forwarding, hunt group, et cetera. It is also well known that advanced services operate as factors for market differentiation and are crucial for network operators' (and/or service providers') success.

Those skilled in the art should appreciate that although advanced telecommunications networks of today (whether PSN-only or hybrid networks having several legacy CSNs with interoperable interfaces towards IP-based networks) support myriad communications devices and provide a broad range of services, several drawbacks and shortcomings exist in the state-of-the-art service provisioning schemes. For instance, a subscriber cannot access the same set of services and service data with different devices (e.g., mobile phone, mobile phone, IP phone, etc.).

In addition, mechanisms for specifying service policies with respect to the devices used by a subscriber in today's hybrid networks are inflexible and, therefore, are poorly optimized for devices being developed in the context of IP-based telephony. That is, although an end-user can specify policies on a device basis with respect to some of the services for which he has a subscription, the policy of each device is typically implemented using its dedicated service infrastructure (e.g., a Wireless Intelligent Network or WIN) in the network to which the device is attached. As a consequence, the relationship between service policies and devices is provided as a static association wherein it is not possible to define service policies for dynamically allocable devices (e.g., an IP host device or a device that can be personalized by using a Subscriber Identity Module (SIM), and the like).

Based on the foregoing, it should be apparent that there has arisen an acute need for a robust device-aware service provisioning solution for use within the context of the burgeoning VoIP technology which overcomes these and other shortcomings and deficiencies of the state-of-the-art.

SUMMARY OF THE INVENTION

Accordingly, the present invention advantageously provides a device-aware service provisioning scheme for use in a hybrid/integrated telecommunications network having an IP-based PSN portion and one or more CSN portions such as, e.g., a POTS portion, a wireless network portion, etc. A user profile is provided which partitions a service in three dimensions: a user-specific service part, a device-specific service part, and a combination part which specifies service conditions when an end-user uses a particular device or terminal. A common IP telephony VAS infrastructure is included wherein device-aware service triggers are provided.

Before processing a call (originating or terminating), a service switching node retrieves the user profile which includes the device-aware service triggers. While processing a call, upon encountering an armed detection point, the service switching node generates an appropriate device-aware trigger which will fire the execution of any relevant service logic program(s) in the service node.

In a further aspect, the present invention is directed to a device-aware call diversion method for use in an integrated telecommunications network having a service switching node and a service node. Before processing a call (originating or terminating), the service switching node retrieves the user profile which includes the device-aware service triggers. While processing a call, upon encountering an armed detection point, the service switching node generates an appropriate device-aware trigger which will fire the execution of any relevant service logic program(s) in the service node. Preferably, a device-specific service part of the user profile specifies service triggers applicable to a particular device designated for use by the user with respect to call diversion. Thereafter, upon executing the appropriate service logic program responsive to the device-aware trigger from the service switching node, the service node subsequently transmits a routing number to the service switching node which is used for diverting the call by the service switching node.

In yet further aspect, the present invention is directed to a hybrid telecommunications network having a PSN portion and a CSN portion that provides device-aware services. A plurality of heterogeneous communication devices operable with a host of protocols are included the hybrid telecommunications network. A service switching node is provided for invoking a device-aware service based on a device-aware service trigger encountered in a call control process. The hybrid telecommunications network also comprises a trigger server containing a user profile which includes a user-specific service part, a device-specific service part, and a combination service policy part that is applicable when an end-user uses a select device of the plurality of communication devices. Before processing a call (originating or terminating), the service switching node retrieves the user profile which includes the device-aware service triggers. While processing a call, upon encountering an armed detection point, the service switching node generates an appropriate device-aware trigger which will fire the execution of any relevant service logic program(s) in the service node. The service switching node accordingly transmits a service request to a service node in the network, based on the device-aware service trigger information obtained from the trigger server. The service node accordingly executes the service logic program based on the service information obtained from the service switching node.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF EMBODIMENTS

Figure 1:
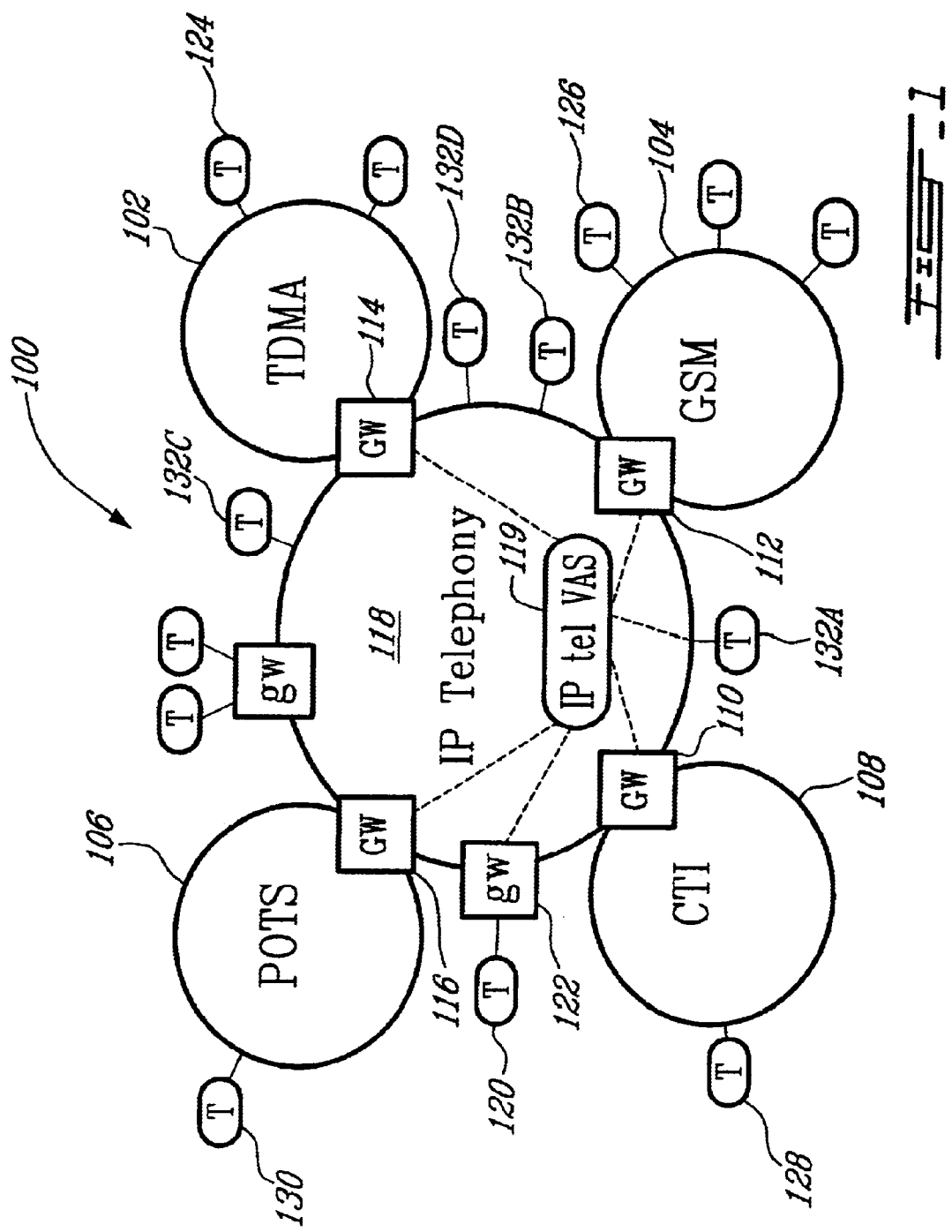
FIG. 1 depicts a generalized heterogeneous telecommunications environment wherein device-aware services may be provisioned in accordance with the teachings of the present invention.

In the drawings, like or similar elements are designated with identical reference numerals throughout the several views, and the various elements depicted are not necessarily drawn to scale. Referring now to FIG. 1, depicted therein is a generalized telecommunications environment 100 wherein one or more heterogeneous CSN portions are coupled to an IP telephony network 118 (such as, e.g., one based on H.323, SIP, and the like) having device-aware Value-Added Services (VAS) in accordance with the teachings of the present invention. Each of the CSN portions is provided with a suitable gateway for coupling to the IP telephony network portion 118. For example, a Time Division Multiple Access (TDMA) cellular network portion 102 is coupled to the IP telephony network portion 118 via a gateway (GW) 114. In a similar manner, GW 116 is provided between a Plain Old Telephone System (POTS) network portion 106 and the IP telephony network portion, and GW 112 is provided between a Global System for Mobile communications (GSM) portion 104 and the IP telephony network portion.

One or more IP terminals or appliances, e.g., T 132A through T 132D, are disposed directly on the IP telephony network portion 118. Furthermore, although not shown in FIG. 1, other entities may be provided as part of the IP telephony network portion 118 depending upon the specific implementation, for example, gatekeepers and Multipoint Control Units (MCUs) (in the case of H.323 implementation), or proxy servers, redirect servers, registrars and so on (in the case of SIP implementation). Also, one or more legacy telephones or appliances (e.g., T 120) are coupled to the IP telephony network portion 118 via an IP adapter or "gateway" (e.g., gw 122).

Each of the CSN portions is also provided with its own devices or terminals for placing calls, etc. For example, mobile terminals such as T 124 and T 126 are illustrative with respect to the TDMA portion 102 and the GSM portion 104, respectively. Similarly, a fixed or wireline phone 130 is illustrated with respect to the POTS portion 106.

In accordance with the teachings of the present invention, an IP telephony service architecture 119 is included in the IP telephony network 118 for the provisioning of advanced services using a common VAS infrastructure, preferably with respect to all of the devices and users in the hybrid telecommunications environment 100. Further, the IP telephony service architecture 119 of the present invention advantageously provides a means for distinguishing between users and the devices/terminals users may employ (regardless of the protocols used therewith) such that user-specific parts, device-specific parts, and parts specific to appropriate user/device combinations may be separately designated.

Figure 2:
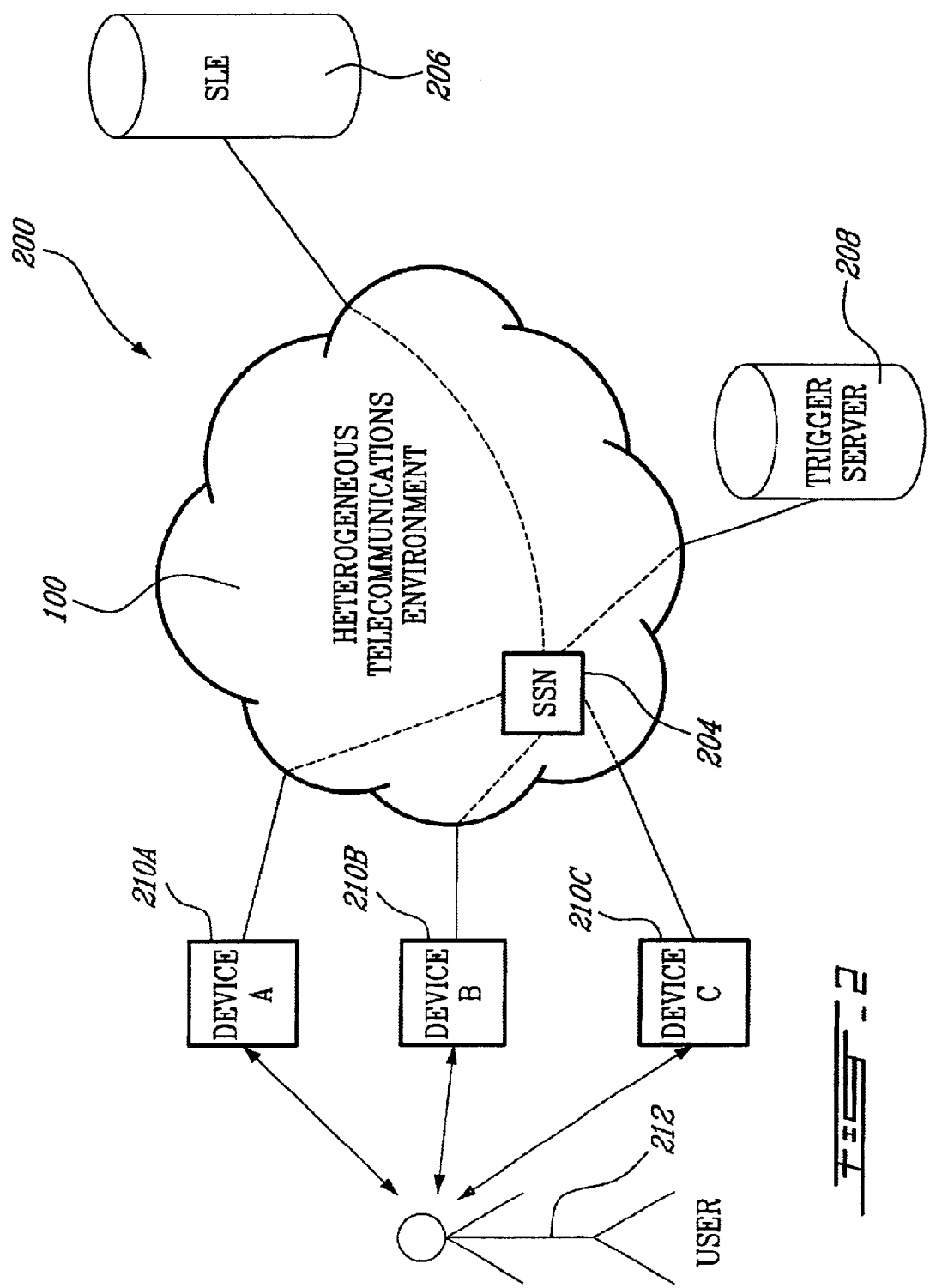
FIG. 2 depicts a functional block diagram of an exemplary embodiment of an integrated/hybrid telecommunications network for the provisioning of device-aware VAS.

Referring now to FIG. 2, depicted therein is a functional block diagram of an exemplary embodiment of an integrated/hybrid telecommunications network 200 for the provisioning of device-aware VAS in accordance with the teachings of the present invention. Those skilled in the art should appreciate that the hybrid network 200 comprises an abstraction of the heterogeneous telecommunications environment 100 described hereinabove, wherein one or more appropriate service switching nodes (SSNs), e.g., SSN 204 are included for the purpose of call control and service provisioning. A trigger server 208 is provided in the hybrid network 200 for storing user profiles or service policies, which may include user-specific parts, device-specific parts, and parts specific to appropriate user-device combinations. Further, the SSN entity 204 is provided with the capability of retrieving the user profile from the trigger server 208 which includes the device-aware service triggers before processing a call (originating or terminating). While processing a call, upon encountering an armed detection point, the SSN generates an appropriate device-aware trigger which will fire the execution of any relevant service logic program(s) in a service node such as, e.g., Service Logic Environment (SLE) 206.

The SLE 206 comprises appropriate service logic programs (SLPs) which are executed based on service requests emanating from the SSN entity 204. In accordance with the teachings of the present invention, these service requests are formulated by the SSN 204 based on the service policy information obtained from the trigger server 208.

A plurality of communication devices or terminals, e.g., reference numerals 210A–210C, are provided in the hybrid network 200 which an end-user (e.g., user 212) may operate to obtain different services, e.g., voice, data, email, etc. Furthermore, each device may be of a different type such as a POTS phone, mobile terminal, an IP terminal (e.g., a SIP phone), etc. Additionally, it should be realized that some device-specific parts of a VAS may be dynamically re-assignable in the hybrid network 200.

Figure 3:
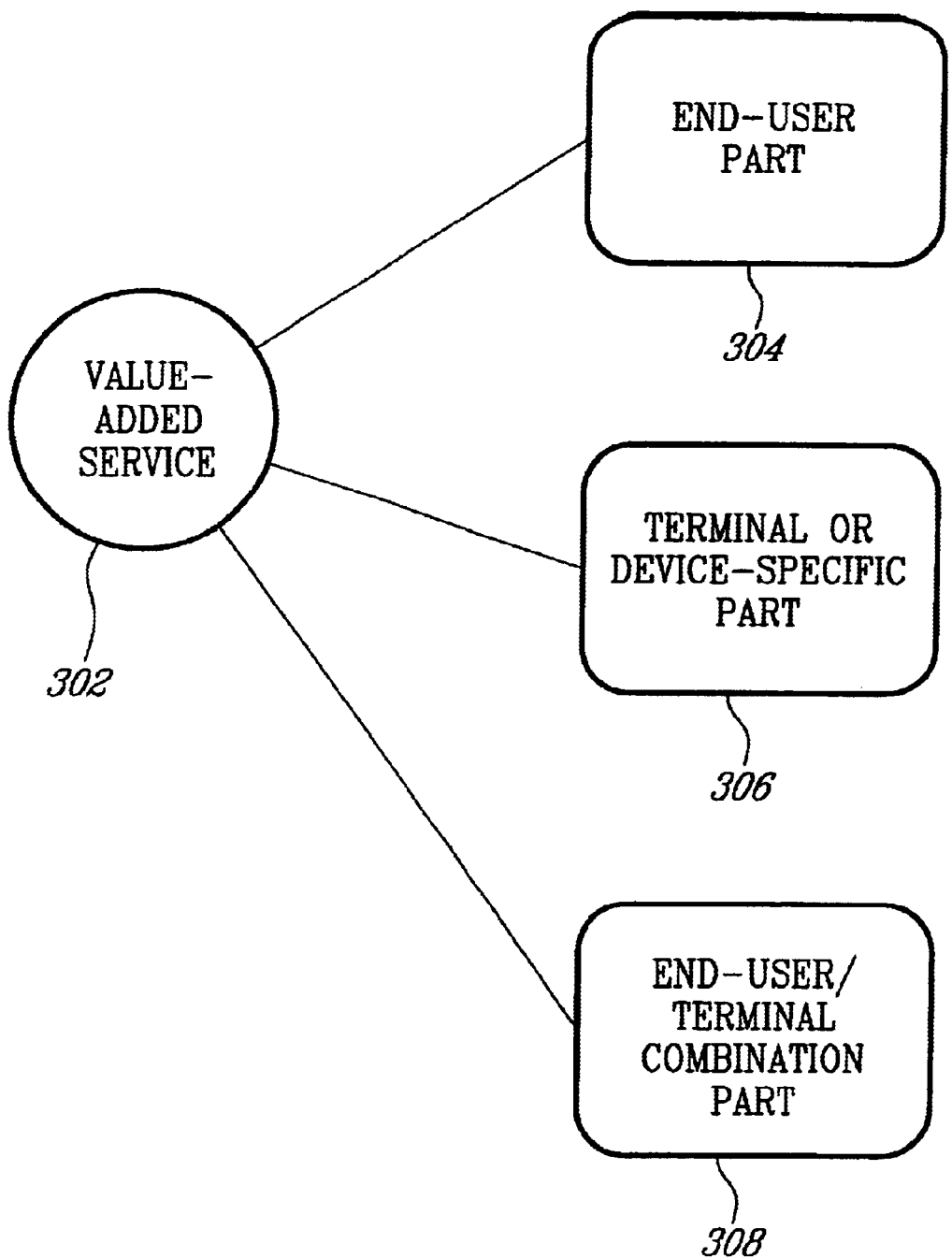
FIG. 3 depicts a three-dimensional functional partitioning of the service components of a VAS provided in accordance with the teachings of the present invention.

FIG. 3 depicts a three-dimensional functional partitioning of the various service parts of a VAS 302 provided in accordance with the teachings of the present invention. Considering a single user and a single terminal, three categories or dimensions of the VAS 302 may be designated as follows:

End-User Part 304: This part refers to a service part which is applicable to the end-user (i.e., user) regardless of the terminal the end-user operates.

Terminal Part 306: This part refers to a service part which is applicable to a terminal, independently of the end user who uses it. The service part therefore includes device-specific service conditions that apply when a particular device is used.

End-User/Terminal Combination Part 308: This part refers to a service part which is applicable to the end-user when he uses a particular terminal.

Figure 4:
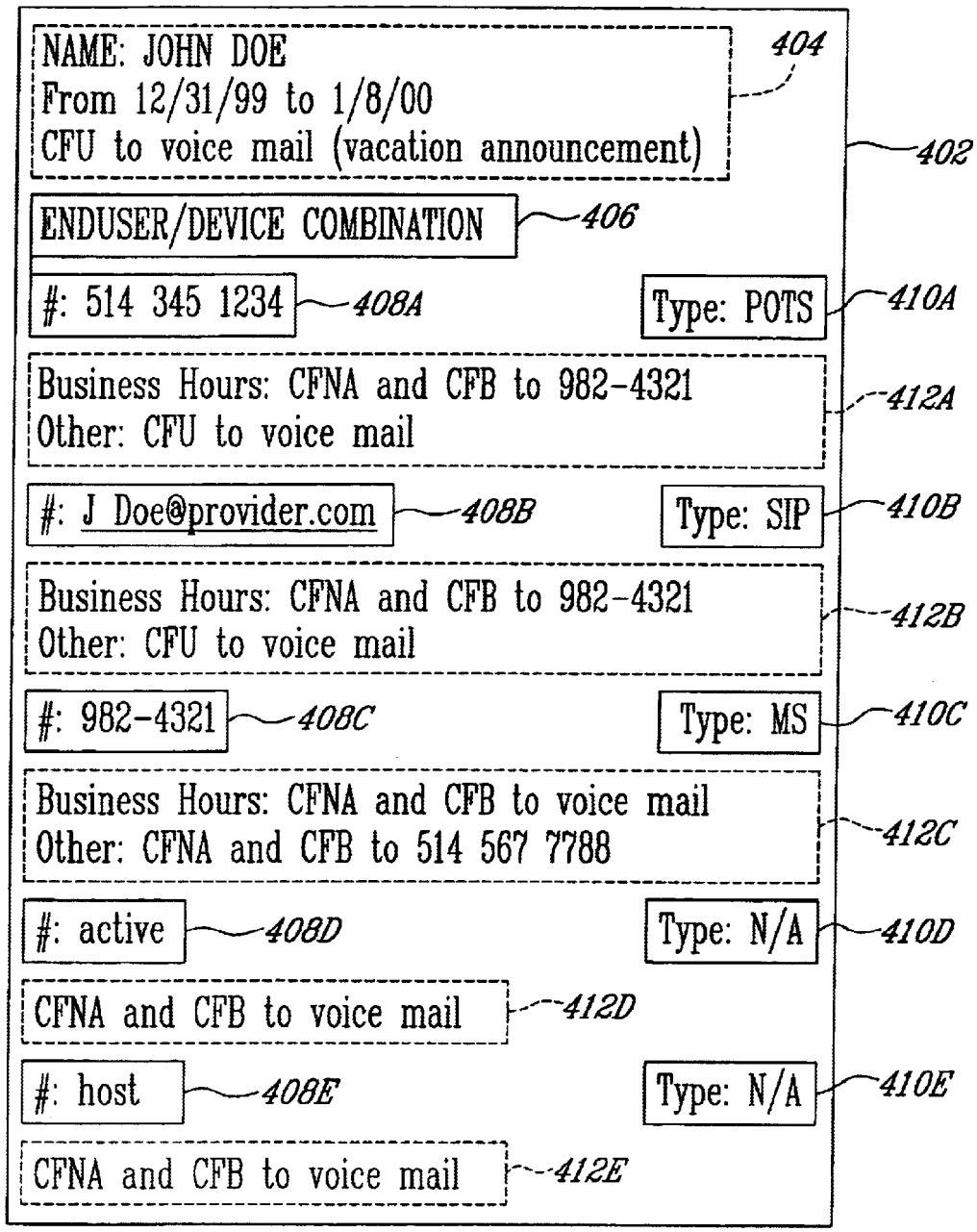
FIG. 4 depicts an exemplary user profile for a device-aware call diversion service provided in accordance with the teachings of the present invention.

FIG. 4 depicts an exemplary user profile 402 for a device-aware call diversion service provided in accordance with the teachings of the present invention. The user profile 402 advantageously distinguishes between a user-specific service part 404 and an end user/device combination service part 406 which has several components. The user-specific part 404 for the user (e.g., John Doe) preferably designates a time period during which a Call Forward Unconditional (CFU) service is to be provisioned. Accordingly, the CFU service diverts all calls to John Doe during the designated time period to a voice mail box having an announcement.

The end user/device combination part 406 specifies the service policy for the rest of the time and comprises the following components, the semantics of which are:

Reference numeral 408A refers to a phone number used by John Doe in his office and reference numeral 410A identifies the device as a POTS phone. Reference numeral 412A refers to a service policy for this device which specifies that when he is not available during business hours, a Call Forward No Answer (CFNA) or a Call Forward Busy (CFB) service is to be invoked such that calls are diverted to his mobile phone, its number being 982-4321. During off-business hours, the CFU service is to be invoked whereby calls are diverted to his voice mail.

Reference numeral 408B refers to a SIP URL used by John Doe in his office and reference numeral 410B identifies the device as a SIP phone (e.g., a laptop computer with SIP telephony). Reference numeral 412B refers to the service policy for this device which specifies that when he is not available during business hours, a CFNA or a CFB service is to be invoked such that calls are diverted to his mobile phone, 982-4321. During off-business hours, the CFU service is to be invoked whereby the calls are diverted to his voice mail.

Reference numeral 408C refers to John Doe's mobile phone number and reference numeral 410C identifies it as such. Reference numeral 412C refers to the service policy for this device which is John Doe's main communication device in this exemplary scenario. The service policy 412C specifies that during business hours, when not available, a CFNA or a CFB service is to be invoked whereby calls are diverted to his voice mail. During off-business hours, only very important calls are expected to be addressed to the mobile phone, they are therefore diverted by a CFNA or CFB service to his fixed phone at home, its number being (514) 567-7788.

Reference numeral 408D refers to an Information Appliance that is personalized by employing, for example, a Subscriber Identity Module (SIM) card, for use with a telecommunications network to achieve personal mobility. Reference numeral 410D identifies that the device's type is N/A, as there may be several types of Information Appliances which support SIM cards, etc. for personal mobility. John Doe instructs the telecommunications network by introducing an appropriate module in the active Information Appliance 408D that this is the device with which he can currently be reached. In case he does not want to answer a call received at the active device, it is diverted to his voice mail because of a CFNA or CFB service.

John Doe may also be accepted as a host on an IP telephony device, identified by reference numeral 408E. That is, the device is not explicitly allocated to him (e.g., a public IP telephony device, or a third party's device (such as a friend's device)). However, John Doe is able to dynamically declare to the device that some calls may be addressed to him on that device. Once again, the device's type is N/A as labeled by reference numeral 410E, because there may be several types of such IP telephony devices that accept hosts. Reference numeral 412E refers to the service policy which specifies that if for some reason John Doe does not answer his calls on the device 408E, they are to be diverted to his voice mail.

Those skilled in the art should appreciate that the last two devices, i.e., device 408D and device 408E, of the user profile 402 are virtual, in the sense that they may be dynamically allocated and de-allocated to actual physical devices during the lifetime of the service.

Figure 5:
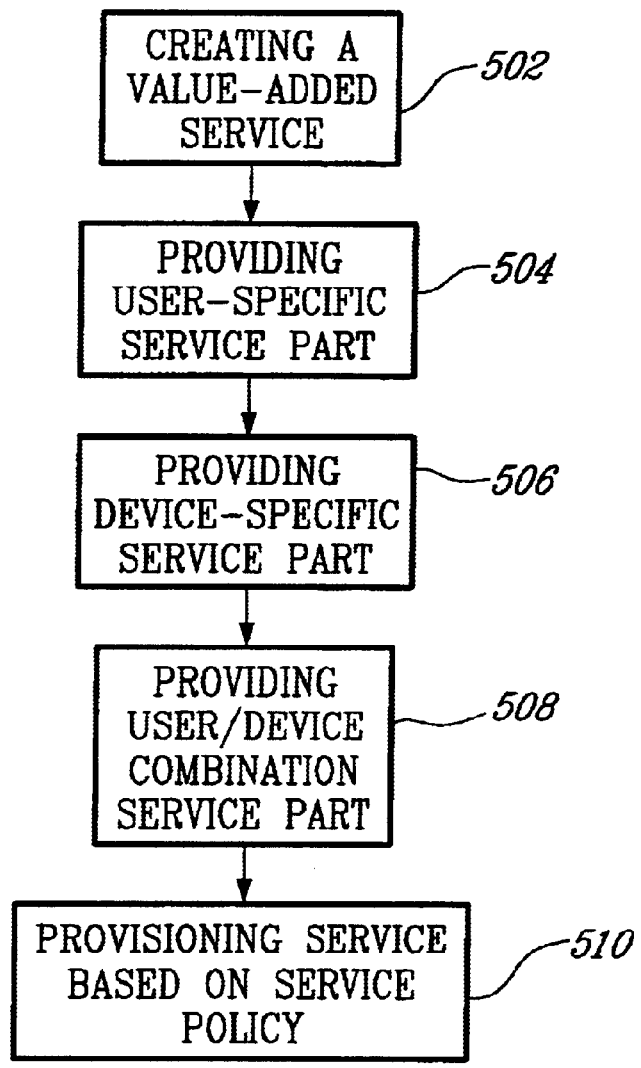
FIG. 5 is a flow chart of an exemplary service provisioning methodology of the present invention.

FIG. 5 depicts a flow chart of an exemplary service provisioning methodology of the present invention. When a service provider creates a particular VAS (step 502), the VAS may be advantageously structured in a three-dimensional partitioning as described in the foregoing. A user-specific part may be provided (step 504) to cover the aspects of the service that are specific to a user regardless of the devices, actual or virtual, he uses with respect to the service. A device-specific part is provided (step 506) to cover the aspects of the service that are specific to the various devices the user uses and are provided to be independent of what the user's service policy might be. Also, a user/device combination service part is provided (step 508) for covering specific service policies that apply when the user uses a particular device. The service may be provisioned (step 510) using appropriate user profiles as described hereinabove with respect to FIG. 4.

Figure 6:
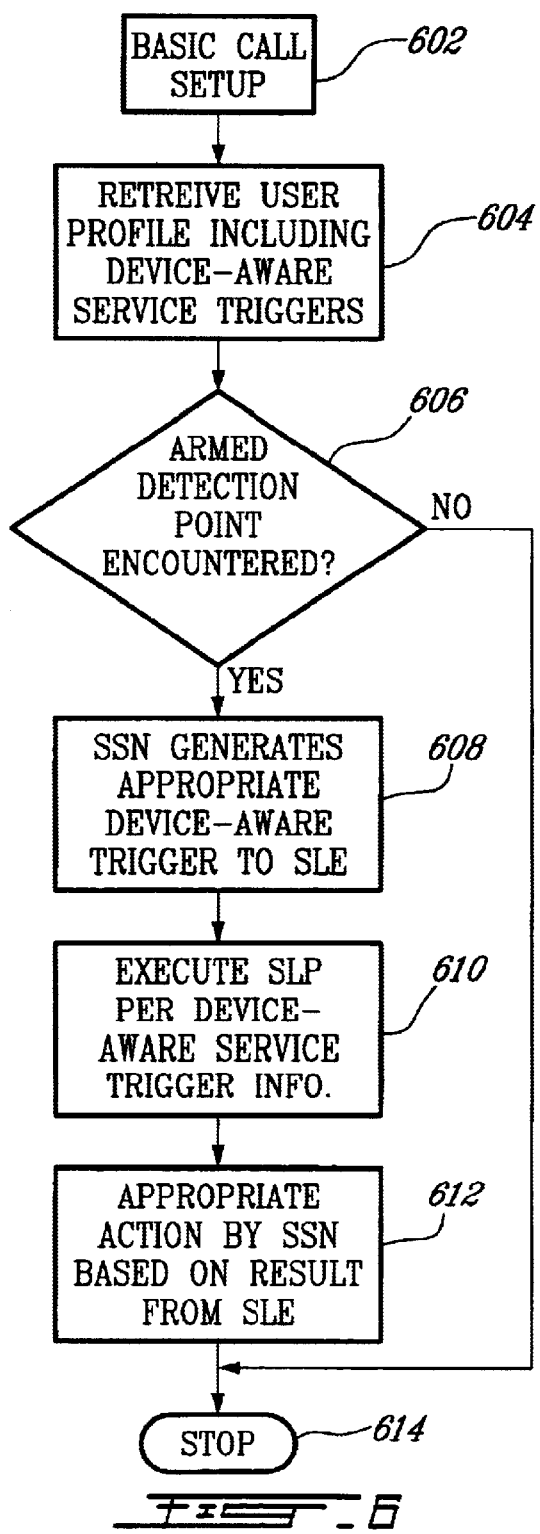
FIG. 6 is a flow chart of the steps of an exemplary embodiment of a device-aware service method in accordance with the teachings of the present invention.

FIG. 6 is a flow chart of the steps of an exemplary embodiment of a device-aware service method in accordance with the teachings of the present invention. After initiating a basic call set up (step 602), the SSN retrieves a user profile which includes device-aware service triggers (step 604) before processing the call (originating or terminating). Thereafter, while processing the call, a determination is made whether an armed detection point is encountered (decision block 606). If so, the SSN generates an appropriate device-aware trigger to the service node (step 608). Based on the device-aware trigger information, an appropriate SLP is executed at the service node (step 610). Subsequently, the service switching node takes a service-related action in response to the result or results obtained by executing the SLP (step 612). The exemplary device-aware service method thereafter terminates (step 614).

Based on the foregoing, it should be appreciated that the present invention advantageously provides a device-aware VAS architecture which uses a single IP service infrastructure provided in a heterogeneous telecommunications environment. Accordingly, the inefficiency of the prior art solutions which require supporting multiple service infrastructures is advantageously eliminated. Also, the present invention provides the capability to define service policies for virtual devices (i.e., active or host devices) in a hybrid network.

Further, it is believed that the operation and construction of the present invention will be apparent from the foregoing Detailed Description. While the method and system shown and described have been characterized as being preferred, it should be readily understood that various changes and modifications could be made therein without departing from the scope of the present invention as set forth in the following claims. For example, although the teachings of the present invention have been exemplified within the context of a device-aware call diversion service, it should be understood that other advanced services may also be provisioned by providing appropriate device-specific service parts in accordance with the teachings of the present invention. That is, the teachings hereof may also be applied in the context of the following services including, but not limited to: toll free and credit card calling, cellular hunt, selective call restriction, click to fax, double phone/free phone, split charging, and multimedia applications such as tele-medicine, tele-education, video-on-demand, et cetera. Moreover, it should be understood that the use of a hybrid network embodying a heterogeneous telecommunications environment is illustrative only, and the teachings of the present invention may be practiced in a pure IP telephony network also.

Furthermore, while certain device types have been described in the exemplary embodiments of the present invention, any combination of devices, e.g., VAS-enabled Personal Digital Assistants, "smart" phones, personal computers, laptop computers, palmtop computers, Information Appliances, wireless transceiver wrist watches, pagers, et cetera, may be provided for the purposes of the present invention. In addition, although the teachings of the present invention have been particularly exemplified in the Detailed Description hereof using the IN service architecture, the present invention can be extended without undue experimentation to other service architectures as well. Accordingly, it should be realized that these and other numerous variations, substitutions, additions, re-arrangements and modifications are contemplated to be within the ambit of the present invention whose scope is solely limited by the claims set forth below.

What is claimed is:

1. A device-aware service provisioning method for use in a telecommunications network having a service switching node and a service node, comprising the steps of:

specifying service conditions applicable to a particular user regardless of a device used by the particular user, utilizing a user-specific service policy part in a user profile;

specifying service conditions applicable to a particular device used by the user, utilizing a device-specific service policy part in the user profile;

specifying service conditions applicable to the user when the user uses a particular device, utilizing a combination service policy part in the user profile;

retrieving the user profile by the service switching node which includes at least one device-aware service trigger;

upon encountering an armed detection point, generating an appropriate device-aware service trigger by the service switching node towards the service node;

executing at least one appropriate Service Logic Program by the service node, responsive to the device-aware service trigger generated by the service switching node step; and taking an appropriate service action by the service switching node responsive to an instruction from the service node, the instruction resulting from the execution of at least one SLP.

2. The device-aware service provisioning method for use in a telecommunications network as set forth in claim 1, wherein the device comprises a wireline phone.

3. The device-aware service provisioning method for use in a telecommunications network as set forth in claim 1, wherein the device comprises a mobile phone.

4. The device-aware service provisioning method for use in a telecommunications network as set forth in claim 1, wherein the device comprises an IP phone selected from the group consisting of: Session Initiation Protocol (SIP) terminal, H.323 terminal, Internet Appliance, Internet phone, PC phone, laptop phone, smart phone, PDA phone, and Web phone.

5. The device-aware service provisioning method for use in a telecommunications network as set forth in claim 1, wherein the device comprises an Information Appliance activated by a personalization module associated with the user.

6. The device-aware service provisioning method for use in a telecommunications network as set forth in claim 1, wherein the device comprises an Information Appliance activated by a Subscriber Identity Module (SIM) associated with the user.

7. The device-aware service provisioning method for use in a telecommunications network as set forth in claim 1, wherein the device comprises an IP telephony host device.

8. A hybrid telecommunications network having a packet-switched network portion and a circuit-switched network portion, comprising:

a plurality of communication devices operable with the hybrid telecommunications network;

a service switching node for invoking a device-aware service based on a device-aware service trigger encountered in a call control process;

a trigger server containing a user profile which includes a user-specific service policy part, a device-specific service policy service part, and a combination service policy part that is applicable when an end-user uses a particular device of the plurality of communication devices, wherein the service switching node queries the trigger server upon encountering the device-aware service trigger in the call control process; and a service node having means to execute a Service Logic Program based on information obtained from the service switching node.

9. The hybrid telecommunications network as set forth in claim 8, wherein the particular device comprises an IP phone selected from the group consisting of: Session Initiation Protocol (SIP) terminal, H.323 terminal, Internet Appliance, Internet phone, PC phone, laptop phone, smart phone, PDA phone, and Web phone.

10. The hybrid telecommunications network as set forth in claim 8, wherein the particular device comprises a wireline phone.

11. The hybrid telecommunications network as set forth in claim 8, wherein the particular device comprises an Information Appliance activated by one of a personalization module and a Subscriber Identity Module (SIM) associated with the user.

12. The hybrid telecommunications network as set forth in claim 8, wherein the particular device comprises an IP telephony host device.

13. The hybrid telecommunications network as set forth in claim 8, wherein the particular device comprises a mobile phone.

14. A device-aware call diversion method for use in an integrated telecommunications network having a service switching node and a service node, the method comprising the steps of:

receiving a call in the service switching node for a user;

determining, in the service switching node, if a device-aware service trigger is encountered in a call control process associated with the call;

if so, querying by the service switching node a user profile associated with the user to determine if a particular device-specific service part of the user profile is to be invoked, wherein the device-specific service part specifies service conditions applicable to a particular device designated for use by the user with respect to call diversion;

responsive to the querying step, instructing the service node, by the service switching node, to execute a Service Logic Program associated with the service conditions specified in the device-specific service part;

transmitting, by the service node, a routing number to the service switching node based on the execution of the Service Logic Program; and diverting the call by the service switching node to the routing number obtained from the service node.

15. The device-aware call diversion method for use in an integrated telecommunications network as set forth in claim 14, wherein the device comprises an IP phone selected from the group consisting of: Session Initiation Protocol (SIP) terminal, H.323 terminal, Internet Appliance, Internet phone, PC phone, laptop phone, smart phone, PDA phone, and Web phone.

16. The device-aware call diversion method for use in an integrated telecommunications network as set forth in claim 14, wherein the device comprises a wireline phone.

17. The device-aware call diversion method for use in an integrated telecommunications network as set forth in claim 14, wherein the device comprises an Information Appliance activated by one of a personalization module and a Subscriber Identity Module (SIM) associated with the user.

18. The device-aware call diversion method for use in an integrated telecommunications network as set forth in claim 14, wherein the device comprises an IP telephony host device.

19. The device-aware call diversion method for use in an integrated telecommunications network as set forth in claim 14, wherein the device comprises a mobile phone.

* * * * *